United States Patent [19]
Lincoln et al.

[11] Patent Number: 5,765,403
[45] Date of Patent: Jun. 16, 1998

[54] WATER TREATMENT METHOD AND APPARATUS

[75] Inventors: Phillip A. Lincoln, Westland; Jessie E. Roberts, Belleville, both of Mich.

[73] Assignee: Tri-Mark Metal Corporation, Detroit, Mich.

[21] Appl. No.: 575,642

[22] Filed: Dec. 20, 1995

Related U.S. Application Data

[63] Continuation-in-part of Ser. No. 467,779, Jun. 6, 1995, and Ser. No. 271,792, Jul. 7, 1994, abandoned, which is a continuation-in-part of Ser. No. 48,790, Apr. 16, 1993, abandoned.

[51] Int. Cl.$^6$ .................................................. D06F 39/08
[52] U.S. Cl. .................. 68/13 R; 68/207; 422/186.12; 422/186.3
[58] Field of Search .................. 68/13 R, 183, 68/207; 422/24, 186.12, 186.18, 186.3

[56] References Cited

U.S. PATENT DOCUMENTS

| | | | |
|---|---|---|---|
| 3,065,620 | 11/1962 | Houser | 68/13 R |
| 3,130,570 | 4/1964 | Rentzepis | 68/13 R |
| 3,194,628 | 7/1965 | Cannon | 68/13 R |
| 4,156,652 | 5/1979 | Wiest | 422/186.12 |
| 4,214,962 | 7/1980 | Pincon | 422/186.3 |
| 4,372,935 | 2/1983 | Botton et al. . | |
| 4,419,331 | 12/1983 | Montalvo . | |
| 4,642,134 | 2/1987 | Van Antwerp et al. | 75/101 R |
| 4,857,277 | 8/1989 | Broomfield | 422/186.07 |
| 4,865,817 | 9/1989 | Burgess et al. . | |
| 4,913,827 | 4/1990 | Nebel . | |
| 5,063,030 | 11/1991 | Sweetman . | |
| 5,097,556 | 3/1992 | Engel | 8/158 |
| 5,241,720 | 9/1993 | Engel et al. | 8/158 |
| 5,256,379 | 10/1993 | DeLoach . | |
| 5,405,590 | 4/1995 | Macedo et al. . | |

OTHER PUBLICATIONS

Terr–Aqua Enviro Systems Air Pollution Control System Description Photochemical Processes for Water Treatment, *Chem. Rev.*, 1993, vol. 93, 671–698.

*Primary Examiner*—Philip R. Coe
*Attorney, Agent, or Firm*—Reising, Ethington, Learman & McCulloch, PLLC

[57] ABSTRACT

A water treatment method and apparatus is described for generating a supply of activated water containing oxidants, including hydroxyl radicals, hydrogen peroxide, and hydroperoxy radicals, but excluding ozone. The apparatus includes a generator having ultraviolet lamps to which air is exposed to create activated air. To suppress the generation of ozone in the activated air, the air subjected to the ultraviolet lamps is maintained at a relative high humidity. Also, the activated air is generated in the presence of a catalyst and using 254 nm light, both of which are believed to aid in the destruction of any ozone generated by the exposure of the air to other wavelengths of the uv light. The catalyst also provides additional oxidants in the air. The activated air is entrained in the water using an injector to thereby produce the activated water. A mixer can be used to subject the activated water coming from the injector to turbulent flow conditions to thereby further break up the activated air within the water. In one specific application, the activated water is utilized as a part of a method and apparatus for washing laundry. The laundry is agitated in wash water made up from the activated water. The wash water can be continuously recirculated from the chamber containing the wash water and laundry, through the injector where additional activated air is added, then through the mixer, and thereafter back into the chamber.

25 Claims, 3 Drawing Sheets

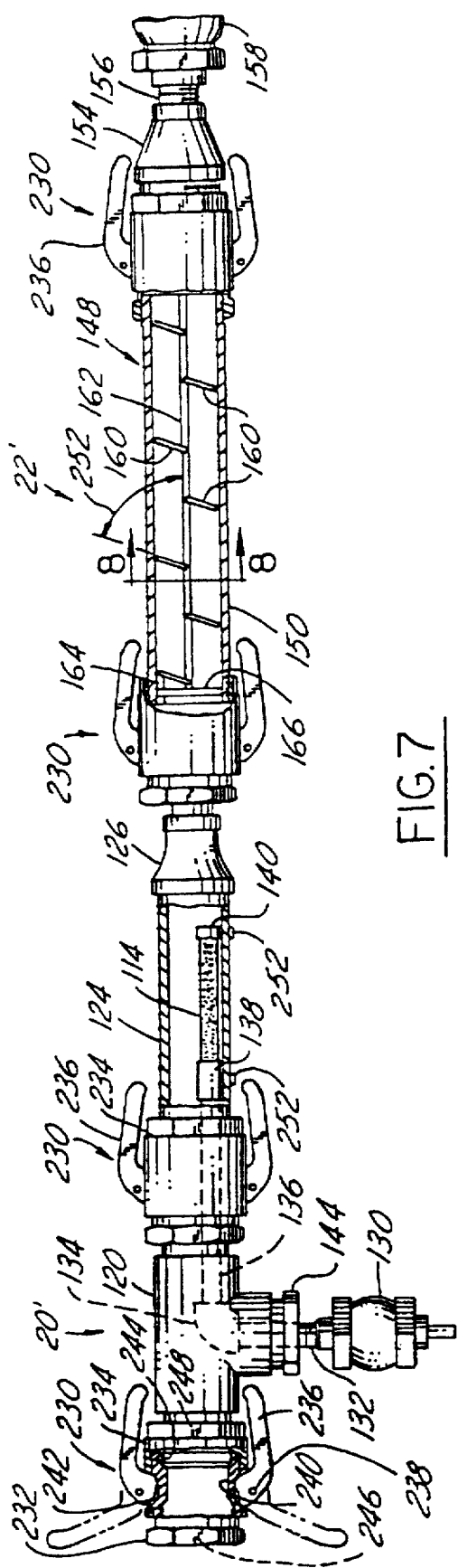
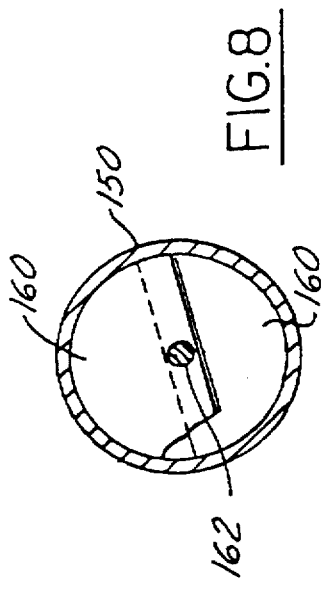

WATER TREATMENT METHOD AND APPARATUS

REFERENCE TO RELATED APPLICATIONS

This application is a continuation of U.S. provisional application Ser. No. 60/006,148 filed Nov. 2, 1995, and is a continuation-in-part of both copending application Ser. No. 08/467,779 filed Jun. 6, 1995, and application Ser. No. 08/271,792 filed Jul. 7, 1994, now abandoned, which is a continuation-in-part of Ser. No. 08/048,790 filed Apr. 16, 1993, now abandoned.

FIELD OF THE INVENTION

This invention relates to the generation of water containing activated air for use in any of a number of different types of water systems and, in one specific application, the invention relates to industrial, commercial, and household laundry washing machines and to a method and apparatus for the generation of water containing activated air for use in such laundry washing machines.

BACKGROUND OF THE INVENTION

For many years industrial and commercial washing machines have washed and cleaned dirty laundry by agitating or tumbling the laundry in wash water in an enclosed chamber. Typically, detergents and other chemicals are added to the wash water to clean the laundry. In some plants, after the wash cycle is completed, the dirty wash water is treated with ozone produced by a corona discharge generator which reduces the biological oxygen demand (BOD) and chemical oxygen demand (COD) of the dirty wash water. In some plants, this treated or cleaned water has been used along with additional fresh makeup water in the washing machine to wash another load of dirty laundry.

The following U.S. Patents provide examples of prior art laundry washing systems that utilize ozone and other oxidants in the wash water: U.S. Pat. Nos. 3,065,620, issued Nov. 27, 1962 to P. H. Houser; 3,130,570, issued Apr. 28, 1964 to P. M. Rentzepis; 3,194,628, issued Jul. 13, 1965 to P. Cannon; 5,097,556, issued Mar. 24, 1992 to R. B. Engel et al.; and 5,241,720, issued Sep. 7, 1993 to R. B. Engel et al. In these systems, ozone is produced by exposing air to ultraviolet radiation that is produced by either a corona discharge or ultraviolet lamps. The activated air containing ozone and, in some cases, hydrogen peroxide is mixed with the wash water to improve the cleaning of laundry and reduce or even eliminate the need for detergents. As used herein, "activated air" should be understood to refer to air that has been treated, whether by exposure to ultraviolet light or some other method, to increase the concentration of oxidants in the air. Similarly, "activated water" means water having activated air dissolved or mixed therein.

Applicants have discovered that when air is passed through a corona discharge generator to produce ozone in the air, it also creates nitric oxide in the air which combines with the wash water and becomes nitric acid. Usually, the nitric acid and bleach in the wash water also produce sodium hydrochloric acid, all of which attack, degrade, and eventually destroy the threads of materials and stitches in the laundry. In practice, this is believed to materially shorten the useful life of the laundered or washed goods.

The literature also suggests that substantial laboratory efforts have been directed to using ultraviolet radiation for other types of water treatment. See Legrini, Oliveros and Braun, "Photochemical Processes For Water Treatment," Chem. Rev. 1993 at pages 671 through 698, American Chemical Society Document No. 0009-2665/93/0793-0871. Ultraviolet radiation for water treatment is potentially useful not only for treating drinking water, but also for treating contaminated surface water, ground water and waste water.

Table I at page 675 of the Chemical Review article (reproduced as "TABLE 1" below) confirms the oxidation potential of various oxidants, many of which are believed to be available from the activated air generated in the system and process of the present invention, as will be described.

TABLE 1

| Oxidation Potentials of Some Oxidants | |
|---|---|
| Species | Oxidation Potential (V) |
| fluorine | 3.03 |
| hydroxyl radical | 2.80 |
| atomic oxygen | 2.42 |
| ozone | 2.07 |
| hydrogen peroxide | 1.78 |
| perhydroxyl radical | 1.70 |
| permanganate | 1.68 |
| hypobromous acid | 1.59 |
| chlorine dioxide | 1.57 |
| hypochlorous acid | 1.49 |
| hypoiodous acid | 1.45 |
| chlorine | 1.36 |
| bromine | 1.09 |
| iodine | 0.54 |

Each of the foregoing references, as well as the literature describing the commercially available air treatment systems described above, all espouse the virtues of ozone and the use of ultraviolet radiation to generate that ozone. However, as shown in Table 1 above, ozone has a lower oxidation potential than hydroxyl radicals. Thus, ozone has less tendency to cause oxidation of the V.O.C.s than the hydroxyl radical; that is, it is less active than the hydroxyl radical. U.S. Pat. No. 4,214,962, issued Jul. 29, 1980 to A. J. Pincon, sets forth other disadvantages of creating ozone in addition to other oxidants formed by ultraviolet radiation; namely, the increase in surface tension of water with which it is mixed and the possible formation of carcinogenic substances. In that patent, an apparatus is disclosed for using ultraviolet light under 200 nanometers to generate an undisclosed activated oxygen product without the production of ozone. When used for treating water for human consumption or swimming pools, the apparatus can include a polyvinyl chloride enclosure to permit liberation of free chlorine to provide chlorination of the water.

Ozonated water has also been used in applications other than water treatment; one example being the treatment of industrial process air exhausted from industrial paint booths, ovens, and conformal coating areas. In one such system, an air stream containing industrial solvents is, among other things, scrubbed in an aqueous reactor with ozonated water that is generated by subjecting air to ultraviolet lights and then injecting the resulting air into the water used in the aqueous reactor.

SUMMARY OF THE INVENTION

The present invention provides a water treatment method and apparatus that produces activated air and injects that air into a supply of water for any of a number of uses, with one specific, disclosed use being the washing of laundry.

The method and apparatus utilize a generator for producing activated air from a supply of humid air, an injector for entraining the activated air into the supply of water to thereby produce activated water, and a mixer that creates a turbulent flow which acts to thoroughly disperse the activated air within the water. The generator includes at least one cell having an axially elongate PVC tube, one or more electrically energized ultraviolet lamps axially mounted along the center of the tube, and a plurality of baffles within the tube which are arranged so as to provide a serpentine path for the flow of air through the tube. The lamp produces ultraviolet radiation which creates the activated air by producing oxidants in the air. The lamp and its lens are selected such that the lamp provides 185 and 254 nanometer ultraviolet light.

The injector has an axially elongate casing tube with a water inlet adjacent one end and a water outlet adjacent the other end, and a discharge tube with a porous sidewall permeable to air disposed in the casing tube. The discharge tube has an outside diameter that is smaller than the inside diameter of the casing tube. The discharge tube is operably connected with the generator and is constructed and arranged so that in operation the activated air produced by the generator passes through the porous sidewall and is discharged into the water flowing through the casing tube.

The mixer has an axially elongate casing tube with a water inlet adjacent one end and a water outlet adjacent the other end, and a plurality of baffles positioned in the casing tube in axially spaced apart relation between the inlet and outlet. The baffles extend generally transversely of the axis of the casing tube and are constructed and arranged to provide a serpentine path for the flow of activated water through the casing tube between its inlet and outlet.

Enhancement of the activity level of the activated air is believed to occur by one or more effects that serve to decompose ozone generated by irradiation from the ultraviolet lamps and thereby permit the liberated atomic oxygen to combine with available atomic hydrogen to form hydroxyl radicals. These effects include photolysis of the ozone using ultraviolet light at a wavelength of 254 nm, degradation of the ozone as a result of creating the activated, air in a high humidity environment, and degradation of the ozone by radicals such as Cl⁻ that are made available by ultraviolet radiation of the PVC used in the generator.

When applied to the washing of laundry, the invention provides a method and apparatus for cleaning laundry in which it is agitated in wash water with bubbles of activated air dispersed therein. The activated air is produced by exposing a supply of humid air to ultraviolet radiation. The wash water with activated air dispersed therein and the laundry can be agitated in a closed chamber through which the wash water is recirculated in a closed loop system.

Preferably, the humid air is subjected to turbulent flow conditions while being exposed to ultraviolet radiation in the presence of a catalyst, such as polyvinyl chloride, to produce various oxidizing radicals. Preferably, more than half of the ultraviolet radiation has wavelengths in the range of 180 to 450 nanometers (nm). The activated air is injected into the wash water as relatively small bubbles and can be dispersed in the wash water by subjecting it to turbulent conditions just before the wash water passes into the chamber. The rate of injection of activated air can be set in accordance with the following parameters: the size of the load of laundry, how dirty it is, and the rate of recirculation of the wash water. Preferably, for a 900 pound load of dry laundry, the activated air is injected into the wash water at the rate of 4 to 30 and preferably 8 to 24 standard cubic feet per minute. The wash water is recirculated at the rate of at least 20 and preferably 40 to 50 gallons per minute for a 900 pound load of dry laundry. The activated air can be injected into the wash water through a porous diffuser under a pressure which is not more than about 3 pounds per square inch greater than the pressure of the wash water, which is preferably in the range of about 20 to 40 pounds per square inch gauge (psig).

In the washing apparatus the laundry and wash water are received and agitated in a chamber through which wash water with activated air dispersed therein is recirculated in a closed loop. A generator produces the activated air by exposing fresh air, preferably under turbulent conditions, to ultraviolet radiation produced by an electrically energized lamp. Preferably, the activated air is injected into the wash water through a porous diffuser permeable to compressed air and having an average pore size no greater than 300 microns. The activated air can be dispersed in the wash water by a mixer, preferably having a plurality of baffles turbulating the wash water passing through it.

When applied to the washing of laundry, some of the objects, features and advantages of this invention are to provide a method and apparatus for washing dirty laundry which has improved stain and oil removal, deodorizing, sanitizing, cleaning, less fading of colors, lower temperature of wash water, uses less soap, detergent, chemicals and fresh water, does not deteriorate the threads of stitches and fibers in the fabric, and has a substantially shorter cycle time which increases productivity, reduces labor and lowers capital equipment and maintenance costs and produces laundry waste water having a substantially lower biological oxygen demand and chemical oxygen demand which results in substantial pollution control or sewage treatment cost savings for producing waste water which can be disposed of without harming the environment.

In another aspect of the invention, a method and apparatus are provided for generating activated air having essentially no ozone contained therein. The method and apparatus utilize a generator having an inlet for receiving a supply of humid air, an outlet for emitting a supply of activated air, and at least one electrically energized lamp. The lamp is operable to produce ultraviolet radiation having a wavelength of about 185 nm, whereby activated air containing hydroxyl radicals and ozone are produced by exposure of the humid air to the ultraviolet radiation. The lamp is also operable to produce ultraviolet radiation having a wavelength of about 254 nm to break down the ozone in the presence of humidity to thereby substantially eliminate the ozone in the activated air.

BRIEF DESCRIPTION OF THE DRAWINGS

These and other objects, features and advantages of this invention will be apparent from the following detailed description, appended claims and accompanying drawings, in which:

FIG. 7 is a side view with portions broken away and in section of a modified activated air injector and wash water mixer for the apparatus of FIG. 1; and FIG. 8 is a sectional view taken generally on line 8—8 of FIG. 7.

DETAILED DESCRIPTION OF THE PREFERRED EMBODIMENT

Figure 1:
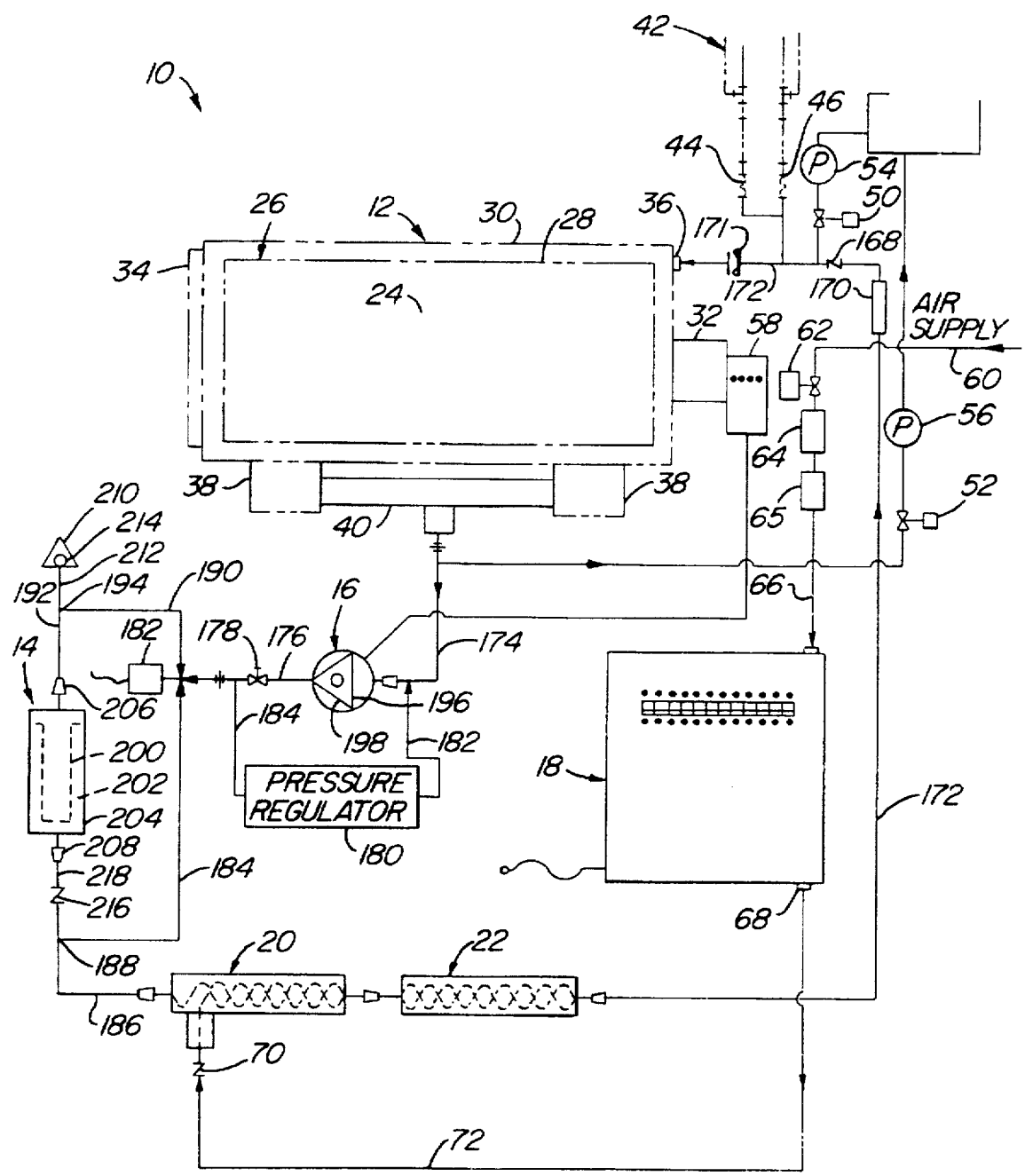
FIG. 1 is a semi-schematic view of an apparatus for carrying out the method of this invention.

In accordance with the method of the invention, laundry is washed by agitating the laundry, such as by tumbling, in recirculating wash water with activated air dispersed in the wash water. The laundry and wash water are received in a closed chamber through which the wash water is recirculated in a closed system with the activated air being dispersed as small bubbles in the water just before entering the chamber. In this way, the laundry is agitated in contact with the activated air in the water in the chamber. Preferably, the wash water is recirculated at the rate of about 15 to 25 and preferably 20 gallons per minute (GPM) for a load of 30 to 75 pounds of dry laundry, 25 to 45 and preferably 30 to 40 GPM for a load of 85 to 600 pounds of dry laundry and 35 to 60 and preferably 40 to 50 GPM for a load 600 to 1500 pounds of dry laundry.

As will be described in greater detail below, the activated air is produced by exposing humid air to ultraviolet radiation to produce oxidant radicals, preferably under turbulent flow conditions and in the presence of a catalyst to enhance oxidant generation and produce additional oxidants. Normally, air having a humidity level of at least 90% is preferred for generating the activated air without also generating ozone. Humidity can be introduced into the air as necessary using a humidifier or by, for example, winking water into available air. The ultraviolet light preferably includes 184.9 nm and 254 nm wavelengths, which can be achieved by enclosing an ultraviolet lamp in a suitable quartz lens, as will be described below. For best results, at least half of the ultraviolet radiation has a frequency in the range of about 180 to 300 nanometers (nm). Even more preferably, at least half of the ultraviolet radiation has discrete wavelengths of 185±5 nm and 254±5 nm. The humid air is exposed to the ultraviolet radiation for at least about 20 seconds, usually 20 to 60 seconds, desirably 20 to 40 seconds, more desirably 25 to 35 seconds and preferably about 30 seconds.

Table 2 lists the relative percentages of the various oxidants and other constituents believed to be in the activated air. The percentages given indicate the relative amounts in the approximately 20% of the activated air that includes oxygen and oxygen bearing compounds.

TABLE 2

| Constituent | Percent by Volume of Air Excluding Nitrogen |
| --- | --- |
| Nitrogen Dioxide (NO$_4$) | ≧0.1% |
| Atomic Oxygen (O$_1$) | ≧4.4% |
| Hydrogen Peroxide (H$_2$O$_2$) | ≧12.6% |
| Hydroperoxy Radical (HO$_2$) | ≧29.4% |
| Hydroxyl Radical (OH) | ≧6.0% |
| Oxygen (O$_2$) | 45.5% |
| Other Oxidants such as NO$_2$, N$_2$O | <1.0% |
| Other gases such as NH$_2$, NH$_3$, C$_2$, N$_2$, HCN, Cl | <1.0% |

As Table 2 above indicates, even though the ultraviolet light includes the 184.9 nm wavelength that is known to cause formation of ozone (O$_3$) in air, no ozone is present in the resulting activated air produced. This is believed to result from the presence of humidity in the supply air which provides a hydrogen rich environment that allows any ozone to almost immediately split and form hydroxyl radicals. This is also believed to result in part from photolysis of the ozone caused by the 254 nm ultraviolet light.

When the activated air is generated by exposure to ultraviolet radiation in the presence of a catalyst, such as polyvinylchloride, it is believed that the following additional radicals are produced:

TABLE 3

Radicals

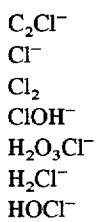

$C_2Cl^-$
$Cl^-$
$Cl_2$
$ClOH^-$
$H_2O_3Cl^-$
$H_2Cl^-$
$HOCl^-$

These radicals further help split the ozone, freeing up oxygen that can then combine with available hydrogen to form the highly active hydroxyl radicals.

Without wishing to be limited to any theoretical explanation, it is believed that, by splitting up the ozone almost as soon as it is generated, the oxygen from the ozone is available to form hydroxyl radicals that have a higher oxidation potential and are therefore more effective as an oxidant than ozone. In this way, the activity level of the activated air can be enhanced. Furthermore, the oxidants produced are negatively charged, and this is believed to result in enhanced effectiveness of the activated air. The relative humidity of the plant or other fresh air used to generate activated air should be at least 25% and, more preferably is within the range of 75–100% and, even more preferably is in the range of 90–100%.

Preferably, the activated air is injected into and dispersed in the recirculated wash water just before it enters the chamber containing the laundry. Preferably, the activated air is injected through a porous tube or cylinder having a sidewall permeable to air and an average pore size usually not greater than 300 microns, desirably in the range of 20 to 200 microns, and preferably about 100 microns. In general, the smaller the average pore size of the injector tube, and hence the smaller the bubbles of activated air in the wash water, the more effective the cleaning action is for heavily soiled laundry.

The preferred rate of injecting the activiated air is a function of the size of the load of dry laundry, how dirty it is and the rate of recirculation of the wash water. As previously indicated, the preferred rate of recirculation of the wash water is a function of the size of the load of dry laundry. For lightly soiled laundry, such as table linens, preferably the activated air is injected at a rate of about 0.75 to 1.5 standard cubic feet per minute (SCFM) for each 10 GPM of the rate of recirculation of the wash water. For normally soiled laundry such as uniforms and work clothing, preferably the activated air is injected at a rate of about 1.0 to 2.0 SCFM for each 10 GPM of the rate of recirculation of the wash water. For heavily soiled laundry, such as inkers, preferably the activated air is injected at a rate of about 2.5 to 3.25 SCFM for each 10 GPM of the rate of recirculation of the wash water. For example, with a load of 900 pounds of dry laundry the preferred wash water recirculation rate is 40 to 50 GPM and the preferred rate of injecting the activated air would be 3 to 7.5 SCFM if lightly soiled, 4 to 10 SCFM if normally soiled, and 10 to 16.25 SCFM if heavily soiled.

The activated air is injected at an air pressure which is desirably in the range of one half to three psi, and preferably one half to two psi, over or greater than the pressure of the wash water at the point of injection. The wash water pressure is usually in the range of 20 to 40 pounds per square inch gauge (psig), desirably 25 to 35 psig, and preferably about 30 psig. Since the water and injected activated air are in a closed loop or system, the water pressure may be substantially constant and the injected activated air largely remains entrained in the water when it enters the chamber containing the laundry.

To more uniformly disperse the activated air in the wash water, immediately after injection, the wash water containing the activated air passes through a mixer which subjects the water to turbulent conditions to more uniformly disperse the activated air. As will be described below, the mixer has a plurality of baffles which create the desired turbulence.

Typically, a batch of dirty laundry may be washed by loading it into a chamber, sealing it, and then admitting the desired level or quantity of wash water into the chamber. Any desired soap, detergents and wash chemicals may also be added to the wash water. Preferably, the wash water is initially recirculated without injecting any activated air, preferably for a period of time of about 1 to 5 minutes, and preferably while the laundry is also being agitated to thoroughly mix and disperse the soaps, detergents and wash chemicals in the water and initially contact them with the laundry.

Thereafter, the activated air is generated and preferably continuously injected into the recirculating water for a period of time of usually 5 to 45 minutes and preferably 10 to 30 minutes while the laundry is also being agitated, such as by tumbling, in the wash water with the activiated air entrained therein. Then, injection of the activated air is stopped, and the sash water continues to be recirculated for at least about 2 minutes to insure that any poisonous gases are converted to non-poisonous compositions. The wash water is drained from the chamber, partially extracted from the laundry, and stored for reuse with another load of dirty laundry. Usually, at least about 75% of the wash water is recovered for reuse. Then any desired fresh water rinse and rinse water extraction operations may be performed. The batch of clean laundry is then unloaded from the chamber.

While recirculating, the wash water can be heated to an elevated temperature, which is usually in the range of 85° F. to 190° F. and any rinse operations may be performed with hot, tepid or cold water as may be desirable for the particular fabrics being washed.

Referring in more detail to the drawings, FIG. 1 illustrates a preferred apparatus 10 for practicing the method of this invention in conjunction with a conventional industrial washing machine 12. The wash water is recirculated through the washing machine and a filter assembly 14 by a pump module 16. Activiated air produced by a generator 18 is entrained in the recirculating water by an injector 20 and dispersed in the recirculating water by a mixer 22 before it enters the washing machine.

In the washing machine a batch of laundry 24 to be washed is received in a generally cylindrical cage or drum 26 with a perforate sidewall 28 which is journalled for rotation in an outer casing or cylindrical chamber 30 by a drive motor 32. As is well known, rotation of chamber 30 provides a means for agitating the laundry in the wash water.

Depending upon the type of washing machine used, other equivalent means could be utilized, such as the central agitator type of mechanism used in most top-loading household washing machines. For loading and unloading the laundry, the chamber has an access opening and door 34, which can be sealed when the machine is in use. Water enters the chamber through an inlet 36 and is typically discharged through a pair of spaced apart outlets 38 interconnected by a manifold 40. Detergents, soaps, wash chemicals and the like may be injected into the water entering the chamber by a metering mechanism 42 connected through solenoid actuated valves 44 & 46 to the inlet. The wash water may be stored in a tank 48 and admitted to and drained from the chamber through solenoid control valves 50 & 52 and pumps 54 and 56. The valves are cycled and controlled from a master control panel 58 of the washing machine. The control panel contains various relays and adjustable timers or programmable controllers and other electronic circuits for varying, adjusting and controlling the washing, extracting, rinsing and other cycles of the washing machine.

Since suitable commercial and industrial washing machines are commercially available and their construction and operation is known to skilled persons, the washing machine 12 will not be described in further detail herein. Suitable washing machines are commercially available from Ellis Corporation of 1400 West Bryn Mawr Avenue, Itasca, Ill. 60143, G. A. Braun, Inc. of 461 East Brighton Avenue, Syracuse, N.Y. 13205, and Pellerin Milnor Corporation, P.O. Box 400, Kenner, La. 70063-0400.

Figure 2:
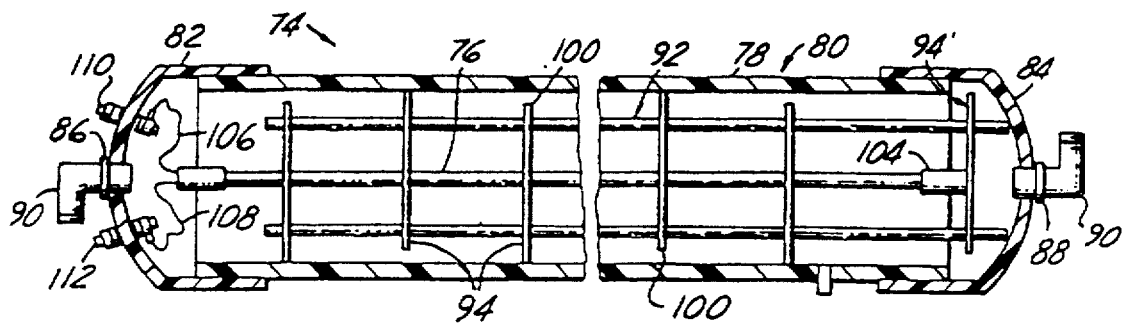
FIG. 2 is a sectional view of a cell of the activated air generator of the apparatus of FIG. 1.
Figure 3:
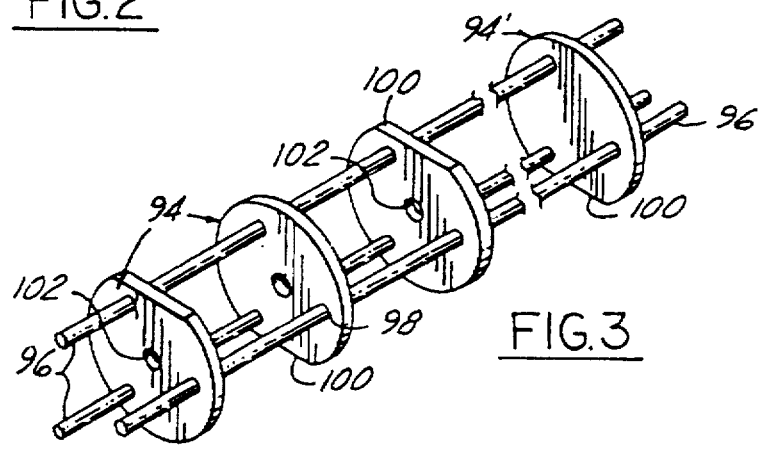
FIG. 3 is a perspective view of the baffle plate subassembly of the generator cell of FIG. 2.

The generator 18 is connected to a source 60 of compressed air through a solenoid operated control valve 62, an adjustable pressure regulator 64, a humidifier 65, and a suitable pipe or hose 66, and in operation supplies activated air to the injector 20 through an outlet 68, a check valve 70 and suitable pipe or hose 72. Humidifier 65 is used to add moisture to the air, preferably in such amounts that the air entering generator 18 is at 90–100% relative humidity. Preferably, the generator has a plurality of substantially identical generator cells 74, only one of which is shown in FIG. 2. Each cell has an ultraviolet lamp 76, preferably in the form of an elongate tube generally concentrically received in a tube 78 of an outer casing 80 with end caps 82 & 84, preferably threaded or otherwise removably received on the tube. Preferably, an air inlet 86 and outlet 88 are received in the end caps with elbows 90 therein. To produce turbulence in the compressed air flowing through the cell, a subassembly 92 of a plurality of baffles 94 is slidably received in the tube 78. The baffles extend transversely to the longitudinal axis of the tube and provide a sinuous flow path for the air. The baffles are retained in spaced apart relationship by three equally circumferentially spaced apart rods 96 which extend through complementary holes 98 in the baffles. Each baffle is a circular disk slidably receivable in the tube 78 and has an edge portion 100 cut away to provide a clearance or passage through which the compressed air flows. All of the baffles, except one end baffle 941, have a central clearance hole 102 through which the ultraviolet lamp tube 78 is received. One end of the lamp tube has a protective cap 104 which bears on the end baffle 941 and, at the other end, a pair of electric connector wires 106 & 108 each connected to a separate terminal 110 & 112 extending through and carried by the end cap 82. An electric current is supplied to the lamp through these terminals.

Desirably, the casing 80 has an inside diameter to axial length ratio of about 1 to 8 to 1 to 16, and preferably about 1 to 12. The baffles are spaced apart axially substantially equally and at a distance equal to about the inside diameter of the tube to one-half its inside diameter. Typically, the area of the portion 100 cut away from each baffle to provide for the flow of compressed air is not greater than about 10% of the entire area of the baffle.

Cell assembly tube 78, end caps 82 & 84, baffles 18, and retainer rods 96 are made of a material such as polyvinyl chloride (PVC) which is substantially non-permeable to compressed air. If the baffles and/or tube are made of polyvinyl chloride, they will also provide the catalyst when exposing the activated air to ultraviolet radiation which produces the various radicals of Table 3 discussed above. If the rods and baffles are made of PVC, they can be connected together in the sub-assembly 92 by a suitable PVC cement and the sub-assembly can be tacked to a PVC casing tube by deposits of PVC cement. Preferably, the PVC used is Schedule 80 which will provide the desired radicals, yet is dense and will not break down too quickly.

In one practical construction of the generator 18 each cell 74 is made from a commercially available PVC tube 78 having a nominal outside diameter of 6 inches and complementary end caps with an overall length of about 5½ feet. The baffle sub-assembly is also made of PVC with fourteen baffles having a diameter of about 5⅝ inches and a thickness of ⅛ of an inch. The maximum chord depth of the removed edge portion is about ⅝ of an inch. A suitable ultraviolet lamp tube having an overall length of about 61 inches is commercially available from Voltarc Technologies of 186 Linwood Avenue, Fairfield, Conn. 06430.

A generator unit with eight of these cells connected in series had an output of activated air of about twelve standard cubic feet per minute when operated with a compressed air outlet pressure about 2–3 psi greater than the injector 20 water pressure of 30 psig. The activated air produced by this generator is believed to typically have the quantity of constituents set forth in Tables 2 and 3 above. In use an electric current of about 120 volts and 1 amp is applied to each ultraviolet lamp 76 to emit ultraviolet radiation.

As mentioned above, the activated air produced by generator 18 contains essentially no ozone and experimental analysis has confirmed that no detectable levels of ozone are present in the activated air. This is believed to result from one or more of the following phenomena: decomposition of ozone due to the presence of high humidity; selection of ultraviolet light wavelengths, and the presence of radicals from the PVC catalysts. It is generally believed that, in a dry environment, ultraviolet radiation at wavelengths shorter than about 220 nanometers will produce ozone and decompose $O_2$ into $O_1$. It is also believed that ultraviolet radiation at a wavelength of 184.9 nanometers is particularly effective in producing ozone. It is further believed that ultraviolet radiation at wavelength of 254 nanometers decomposes ozone. The ultraviolet lamps used in practicing the present invention have a spectral wavelength distributed between 184 and 254 nanometers, with the 184.9 nm light helping to generate ozone and the 254 nm light helping to break down that ozone so that the liberated oxygen can form highly active hydroxyl radicals. Furthermore, the chlorine and other radicals liberated from the PVC by exposure of the catalyst to the ultraviolet radiation is believed to help decompose the ozone and liberate hydrogen for increased hydroxyl radical production.

Figure 4:
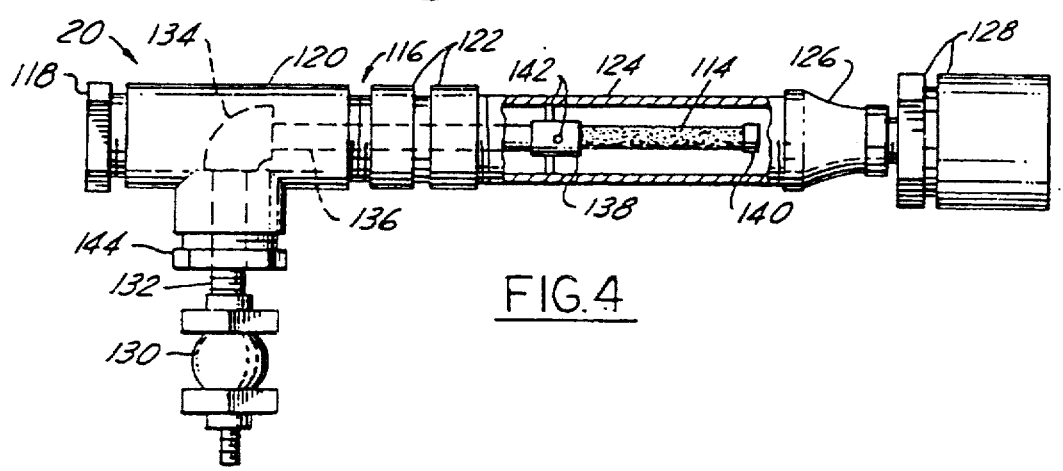
FIG. 4 is a side view with portions broken away and in section of an activated air injector of the apparatus of FIG. 1.

As shown in FIG. 4, the injector 20 has a porous tube 114 through which the activated air is discharged or injected into and entrained in wash water flowing through a tubular housing 116 in which the porous tube is concentrically received. If desired, the housing may be fabricated from commercially available plumbing fittings in a threadedly connected assembly of an inlet bushing 118, a tee 120, a quick disconnect coupling 122, relatively long nipple or pipe 124, an outlet bell reducer 126, and a quick disconnect coupler 128 which in assembly is connected to the inlet end of the mixer 22. Compressed activated air is supplied to the porous discharge tube 114 through a threadedly connected assembly of a check valve 130, nipple 132, elbow 134, nipple 136, and a coupler 138 threaded on the inlet end of the porous tube 114 which has a cap 140 threaded on its other end. The coupling is supported concentrically in the housing pipe 124 by transverse pins 142 fixed to it. The nipple 132 passes through and is carried by a plug 144 threaded in the tee 120.

Discharge tube 114 is of a porous polystyrene material with a sidewall permeable to air and having an average pore size which is usually in the range of 20 to 300 microns, desirably in the range of 20 to 200 microns, and preferably in the range of 20 to 100 microns. The outside diameter of the porous discharge tube is in the range of about ¹⁄₁₀ to ½, and preferably ¼ to about ⅓, of the inside diameter of the tube 124 of the casing. A suitable discharge tube is commercially available from Millipore Corporation, Bedford, Mass. 01730. To prevent any rust from staining the laundry and to minimize attack by the activated air, preferably all of the component parts of the injector are made of stainless steel, except for the porous discharge tube.

In one practical embodiment of the injector 20, the porous discharge tube 114 has a length of about 24 inches and an outside diameter of ½ inch, and the casing tube is a stainless steel nipple with a length of 30 inches and inside diameter of about 3 inches.

In operation, compressed activated air is supplied to the injector porous discharge tube 114 at a pressure which is usually in the range of ½ to 3 psi, and preferably ½ to 2 psi, greater than the pressure of the wash water flowing through the housing, which is usually in the range of about 20 to 40 psig, desirably 25 to 35 psig, and preferably about 30 psig. Bell reducer 126 provides a restricted orifice downstream of the porous discharge tube which facilitates entraining the activated air in the wash water.

Figure 6:
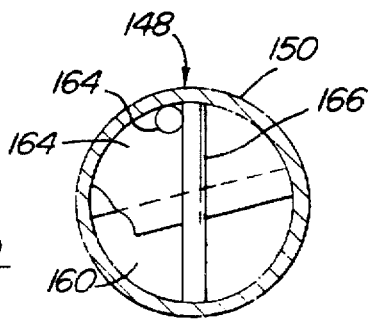
FIG. 6 is a sectional view taken generally on line 6—6 of FIG. 5.
Figure 5:
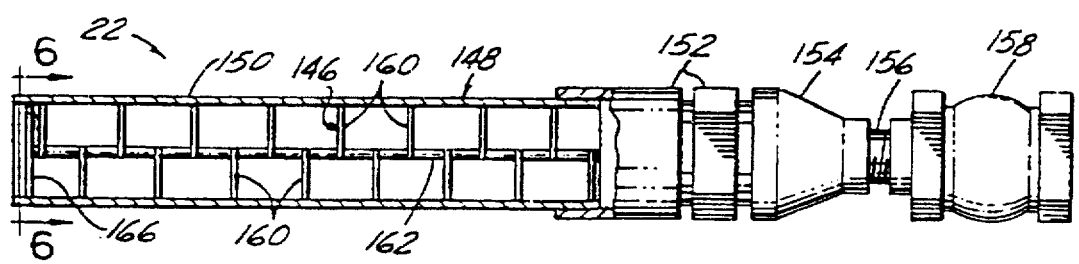
FIG. 5 is an enlarged side view with portions broken away and in section of an activated air and wash water mixer of the apparatus of FIG. 1.

The entrained activated air is more uniformly dispersed in the wash water by the mixer 22. As shown in FIG. 5, the mixer has a baffle assembly 146 received in a housing 148 which produces turbulence in the wash water flowing through it to disperse the activated air therein. The housing may be made of standard plumbing components in a threadedly connected assembly of the quick disconnect 128, a nipple 150, quick disconnect 152, bell reducer 154, nipple 156 and a check valve 158 which prevents backflow of wash water through the mixer. The baffle sub-assembly 146 has a plurality of spaced apart baffles 160 each fixed to a carrier rod 162 such as by welding. As shown in FIG. 6, each baffle 162 is a semi-circular plate of slightly more than half a circle and alternate baffles are disposed in generally diametrically opposed relationship to provide a sinuous flow path for the wash water through the mixer. The baffles are substantially equally spaced apart a distance which is usually not greater than the inside diameter of the tube, desirably about ¼ to ¾, and preferably about ½ of its inside diameter.

The outside diameter and peripheral portion of each baffle is only slightly smaller than the inside diameter of the tube so that the baffle assembly can slide into or be telescopically inserted in the tube. To prevent the baffle sub-assembly from being rotated by the flowing wash water, a tang or plug 162 is fixed to an end baffle and when received in the tube abuts a transverse pin 166 fixed to the tube, such as by welding.

To avoid any rust staining the laundry and to resist attack by the activated air, all of the parts of the mixer 22 are made of stainless steel. In one practical embodiment, the mixer has 16 baffles uniformly axially spaced apart 1½", each with a diameter of about 2⅞/16", and adjacent baffles in diametrically opposed relation, and a casing tube which is a 2½" diameter stainless steel pipe or nipple about 24" in length.

In the apparatus 10, the injector 20, mixer 22, washing machine chamber 30 and the pump 16 are connected in series in a closed loop by pipes and/or hoses of suitable non-corrosive materials, such as stainless steel, polyvinyl chloride and neoprene rubber. The outlet of the mixer 22 is connected to the inlet 36 of the washing machine through a check valve 168 preventing backflow, preferably a sight glass 170 of a transparent material, coupler 171 and suitable hoses 172. The outlet manifold of the washing machine is connected to the inlet of the pump by a suitable flexible hose 174. The outlet of the pump is connected by a suitable hose 176 to the inlet of an adjustable flow rate control valve 178. To adjust and regulate the pressure of the water supplied to the injector 20, an adjustable pressure regulator control valve 180 is connected by suitable hoses 182 & 184 with the outlet of the flow regulator valve 178 and the inlet of the pump 16.

The pressure and flow rate regulated outlet of the PUMP module is supplied through a solenoid operated three-way valve 182 to the inlet of the injector 20, either directly or through the strainer and filter assembly 14. One port of the three-way valve 182 is directly connected to the inlet of the injector through hoses 184 & 186 and a tee 188. Another port of the three-valve is connected to the inlet of the filter assembly through hoses 190 & 192 and a tee 194.

Impeller 196 of the pump has knife edges or blades 198 which cut or chop strings, cords and other particulate material into relatively short pieces having a maximum overall length not greater than about ½". These particles are removed by the filter assembly when the wash water flows through it.

The filter assembly has a strainer basket 200 and a filter media 202 received in a generally cylindrical housing 204 with an inlet 206 and an outlet 208. The strainer basket has perforate side and bottom walls having relatively large holes with a diameter usually not greater than ¼ of an inch, and preferably about 9/64 of an inch, which separates coarse materials, such as chopped string, cord and the like from the wash water which flows through the basket. The filter media preferably has an average pore size in the range of about 200 to 500 microns which removes fine particles as the wash water flows through it. Typically, the filter media 202 is a material such as stainless steel.

The inlet 206 of the filter assembly communicates with both a port of the control valve 182 and an automatic air vent 210 through hoses 192 & 212 and the tee 194. The air vent has a one-way check valve 214 which is normally open and automatically closes when wash water passes through the filter assembly. The outlet of the filter assembly is connected to the injector 20 through suitable hoses 216 and a one-way check valve 218 which prevents backflow to the filter assembly when in operation, the filter assembly is by-passed by the three-way valve 182 to supply wash water directly to the injector 20.

FIGS. 7 and 8 illustrate a modified and presently preferred injector 201 and mixer 221 which substantially decreases the tendency of string, cord and particulate matter to catch or hang up therein and restrict or even block the flow of wash water through the injector and mixer. To facilitate rapid disassembly, cleanout and reassembly of the housing components of the injector and mixer they are connected together by quick disconnect couplings 230.

Each coupling 230 has a neck or sleeve 232 removably received in a body 234 and releasably retained therein by a pair of cam lock arms 236. To retain the sleeve in the body, each arm 236 is pivotally mounted by a pin 238 on the body and has adjacent one end a cam surface 240 which is received in a groove 242 in the sleeve when the arm is moved to the locking position shown in solid lines in FIG. 7. When the arm is moved to the position shown in phantom, the cam surface 240 is disengaged from the sleeve so that it can be removed from the body. In the locked position, the distal end of the sleeve bears on a gasket 244 received in a recess in the body to provide a seal between them. For attachment to adjacent components, the sleeve is threaded at 246 and the body is threaded at 248. Suitable quick disconnect couplings 230 are commercially available from The Fluid Handling Group Dover Corp/OPW Division, 9393 Princeton-Glendale Road, P.O. Box 405003, Cincinnati, Ohio 45240-5003.

As shown in FIG. 7 the discharge tube 114 of the injector is mounted on the side wall of the housing pipe 124 by cap screws 252 threaded into the coupler 138 and cap 140. To provide a seal, an O-ring is received between the housing pipe 124 and the head of each cap screw. It has been found that mounting the injector on the housing pipe side wall, significantly decreases the tendency of particulate contaminants to hang up in and clog the injector.

The tendency of the mixer 221 to become clogged with particulate contaminants is greatly reduced by inclining the baffle plates 160 to the direction of flow and spacing them farther apart while still producing adequate mixing of the activated air with the wash water. Preferably, the axial spacing between adjacent baffle plates 160 and along the rod 162 is in the range of about 0.8 to 1.2 of the inside diameter of the housing tube 150 and preferably substantially equal to its inside diameter. Each baffle plate is inclined at an acute included angle 252 to the carrier rod 162 and the axis of the housing tube 150 which is desirably in the range of 45° to 75° and preferably about 65° to 70°. This construction of the injector 201 and mixer 221 has been found to dramatically reduce clogging and plugging by recirculating particulate contaminants as well as provide a construction which can be rapidly disassembled, cleaned and reassembled when necessary.

In using the apparatus 10 to wash a batch of dirty laundry 24, typically the batch is loaded into the chamber 30 and cage 26, the chamber door 34 is closed and sealed, and a quantity of wash water is admitted to the chamber from the tank 48 by energizing the pump 54 and the solenoid actuated valve 50 which are preferably controlled by the circuitry in the washer control panel 58. Preferably, the washing of laundry is initiated without injecting any activated air, by energizing the motor 32 to rotate the cage 26 and agitate by tumbling the laundry in the wash water, and recirculating the wash water by activating the pump 16. Any soaps, detergents, wash chemicals and the like may be added, by energizing the control valves 44 & 46 of the dispenser mechanism 42, preferably by the control circuitry of the panel 58. The recirculating wash water may be heated to a predetermined desired temperature which is usually in the range of 85° F. to 190° F. This initial cycle contacts and wets the laundry with the wash water and detergent, soap, chemicals, etc., and disperses them uniformly in the wash water. To remove the strings, cords and other solids that separate from the laundry the wash water is passed through the filter assembly by actuating the three-way valve 182 preferably by the control panel circuitry. Typically, this initial cycle is for a period of 1 to 5 minutes.

Thereafter, the activated air is injected into the recirculating wash water substantially continuously usually for a period of time of about 5 to 45 minutes by energizing the generator 18 and opening the solenoid valve 62, preferably by the control panel circuitry, to supply compressed air to the generator. The compressed air flows through the cells 74 of the generator where it is exposed to ultraviolet radiation, in the presence of a catalyst, to produce activated air which is supplied to the injector 20. Typically, the activated air is supplied to the ejector at a pressure which is regulated and controlled by the regulator valve 64 to be about ½ to 2 psig greater than the pressure of the wash water flowing through the injector. The activated air is discharged through the diffuser tube 114 into the wash water as relatively fine bubbles which are more uniformly dispersed in the wash water as they pass through the mixer 22 due to turbulation of water produced by the baffles in the mixer. The wash water (with bubbles of activated air dispersed and entrained therein) is discharged into the chamber 28 of the washing machine where it is believed the activated air comes directly into contact with the fibers of the fabric of the laundry, thereby enhancing the cleaning and washing action of the laundry. In any event, regardless of any theoretical explanation it has been empirically determined that this apparatus and process enhances and expedites the washing and cleaning of the laundry.

After the washing cycle with activated air is completed, the supply of compressed air to the generator is shut-off by actuating the control valve 62, and the ultraviolet lamps in the cells are deactivated or turned off, preferably by the panel control circuity. The wash water is recirculated for at least a short period of time of about 2–3 minutes. Then recirculation of the wash water is stopped by turning off the pump 16.

The wash water is drained from the washing machine chamber 30 and returned to the tank 48 for reuse in washing another batch of laundry. At least a part of the wash water may be extracted from the laundry by agitating or tumbling it by continued rotation of the cage for a short period of time after the wash water is initially drained from the chamber. If desired, the laundry may then be rinsed, subjected to any other desired conventional treatments and then removed from the washing machine, as is well known in the art.

It has been empirically determined that the method and apparatus of this invention reduces fresh water usage about 15% to 40%, overall actual washing time 30% to 45% depending on the type of laundry, hot wash water temperature 10% to 15%, detergents, soaps and wash chemicals 30% to 50% depending on the type of laundry, and substantially reduces the biological and chemical oxygen demand of the polluted waste water (usually more than 50%) which otherwise usually requires treatment before it can be disposed of in compliance with state and/or federal pollution control and sewage treatment regulations and requirements.

We claim:

1. A laundry washing apparatus comprising: a chamber constructed and arranged to receive laundry and wash water therein, means for agitating the laundry in the wash water, a generator having an electrically energized lamp producing ultraviolet radiation to which air is exposed to produce activated air, an injector constructed and arranged to disperse bubbles of the activated air from the generator in the wash water to produce activated wash water, a mixer having an inlet coupled to said injector and an outlet coupled to said chamber and adapted to subject the activated wash water flowing therethrough to turbulent flow conditions, and a pump constructed and arranged to recirculate the wash water through the chamber with activated air dispersed in the wash water in the chamber while agitating the laundry therein.

2. A laundry washing apparatus comprising: a chamber constructed and arranged to receive laundry and wash water therein, means for agitating the laundry in the wash water, a generator having an electrically energized lamp producing ultraviolet radiation to which air is exposed to produce activated air, an injector constructed and arranged to disperse bubbles of the activated air from the generator in the wash water, a pump constructed and arranged to recirculate the washer water through the chamber with activated air dispersed in the wash water in the chamber while agitating the laundry therein, and said generator has at least one cell having an axially elongate tube having a fluid inlet adjacent one end and a fluid outlet adjacent the other end, an electrically energized and axially elgonate ultraviolet lamp received in and extending generally axially of said tube, and a plurality of baffles received in said tube in axially spaced apart relation and extending generally transversely of the axis of said tube and constructed and arranged to provide a serpentine path for the flow of air through said tube between said inlet and outlet thereof.

3. The apparatus of claim 2 wherein said baffles are constructed and arranged to provide turbulent flow of the compressed air through said tube while being exposed to ultraviolet radiation from said lamp therein.

4. The apparatus of claim 3 wherein said tube has an inside diameter which is not greater than about one-eighth of the generally axial distance between said fluid inlet and fluid outlet of said tube.

5. The apparatus of claim 2 wherein said elongate ultraviolet lamp extends through at least some of said baffles and is generally concentric with said tube.

6. The apparatus of claim 2 wherein said generator comprises a plurality of said cells each having an ultraviolet lamp and baffles therein.

7. The apparatus of claim 6 wherein a plurality of said cells are connected in series for the flow of the air through them.

8. A laundry washing apparatus comprising: a chamber constructed and arranged to receive laundry and wash water therein, means for agitating the laundry in the wash water, a generator having an electrically energized lamp producing ultraviolet radiation to which air is exposed to produce activated air, a mixer constructed and arranged to subject the wash water flowing therethrough to turbulent flow conditions, a pump constructed and arranged to recirculate the wash water through the chamber with activated air dispersed in the wash water in the chamber while agitating the laundry therein, and an injector disposed upstream of said mixer and having an axially elongate casing tube with an inlet adjacent one end and an outlet adjacent the other end through which the water is recirculated, and a discharge tube with a porous sidewall permeable to air disposed in said casing tube, having an outside diameter which is smaller than the inside diameter of said casing tube and being operably connected with said generator and constructed and arranged so that in operation the activated air produced by said generator passes through said porous sidewall and is discharged into the water flowing through said casing tube.

9. The apparatus of claim 8 wherein the outside diameter of said discharge tube is not greater than about one-third of the inside diameter of said casing tube, and said discharge tube extends generally coaxially within said casing tube.

10. The apparatus of claim 9 wherein the average size of the pores of said porous sidewall of said discharge tube is not greater than about 200 microns.

11. The apparatus of claim 9 wherein the inside diameter of said casing tube is not greater than about one-eighth of the axial length between said inlet and outlet of said casing tube, and the axial length of said porous sidewall of said discharge tube at least one-third of the axial length of said casing tube.

12. The apparatus of claim 8 wherein the average size of the pores of said porous sidewall of said discharge tube is not greater than about 200 microns.

13. The apparatus of claim 8 which also comprises a restricted orifice downstream of said discharge tube and having a cross-sectional area which is less than the cross-sectional area of said casing tube through which said discharge tube extends.

14. A laundry washing apparatus comprising: a chamber constructed and arranged to receive laundry and wash water therein, means for agitating the laundry in the wash water, a generator having an electrically energized lamp producing ultraviolet radiation to which air is exposed to produce activated air, a mixer constructed and arranged to disperse bubbles of the activated air from the generator in the wash water, and a pump constructed and arranged to recirculate the wash water through the chamber with activated air dispersed in the wash water in the chamber while agitating the laundry therein, and said mixer has an axially elongate casing tube with an inlet adjacent one end and an outlet adjacent the other end through which water with activated air therein flows and a plurality of baffles received in said casing tube in axially spaced apart relation between said inlet and outlet, said baffles extending generally transversely of the axis of said casing tube and being constructed and arranged to provide a serpentine path for the flow of wash water with activated air therein through said casing tube between said inlet and outlet thereof.

15. The apparatus of claim 14 wherein immediately adjacent baffles are spaced apart an average distance which is less than one-tenth of the length of said mixer casing tube between said inlet and outlet thereof.

16. The apparatus of claim 15 wherein at least a plurality of said baffles of said mixer are generally transverse to the axis of their associated casing tube and each such baffle has a surface area which is at least one-half of the interior cross-sectional area of said casing tube of said mixer.

17. The apparatus of claim 14 wherein said baffles extend generally transversely to the axis of said casing tube at an acute included angle in the range of about 45° to 75°.

18. The apparatus of claim 17 wherein immediately adjacent baffles are axially spaced apart a distance in the range of 0.8 to 1.2 of the inside diameter of said mixer casing tube.

19. The apparatus of claim 8 wherein the outside diameter of said discharge tube is not greater than about one-third of the inside diameter of the wall of said casing tube, said discharge tube extends generally axially within said casing tube and said discharge tube is immediately adjacent the wall of said casing tube.

20. The apparatus of claim 8 wherein said mixer comprises an axially elongate casing tube with an inlet adjacent one end and outlet adjacent the other end through which water with activated air therein flows, and a plurality of baffles received in said casing tube in axially spaced apart relation between said inlet and said outlet, said baffles extending generally transversely to the axis of said casing tube at an acute included angle in the range of about 45° to 75° and being constructed and arranged to provide a serpentine path for the flow of wash water with activated air through said casing tube between said inlet and outlet thereof.

21. The apparatus for claim 20 wherein immediately adjacent baffles are axially spaced apart a distance in the range of 0.8 to 1.2 of the inside diameter of said mixer casing tube.

22. The apparatus of claim 8 wherein the outside diameter of said discharge tube is not greater than about one-third of the inside diameter of the wall of said casing tube, said discharge tube extends generally axially within said casing tube and said discharge tube is immediately adjacent the wall of said casing tube.

23. The apparatus of claim 8 wherein said mixer comprises an axially elongate casing tube with an inlet adjacent one end and an outlet adjacent the other end through which water with activated air therein flows, and a plurality of baffles received in said casing tube in axially spaced apart relation between said inlet and said outlet, said baffles extending generally transversely to the axis of said casing tube at an acute included angle in the range of about 45° to 75° and being constructed and arranged to provide a serpentine path for the flow of wash water with activated air through said casing tube between said inlet and outlet thereof, and a quick disconnect coupling releasably connecting the outlet of said injector casing tube with the inlet of said mixer casing tube.

24. The apparatus of claim 1, wherein said mixer has a plurality of baffles located between said inlet and said outlet, wherein said baffles together define a flow path between said inlet and said outlet that creates turbulence in the activated wash water flowing through said mixer.

25. The apparatus of claim 1, further including a catalyst located in said generator and exposed to the ultraviolet radiation emitted from said lamp.

* * * * *